United States Patent [19]
Walton

[11] 3,967,054
[45] June 29, 1976

[54] TELEVISION MEASURING SYSTEM AND METHOD

[75] Inventor: Joe W. Walton, Goleta, Calif.

[73] Assignee: Circon Corporation, Santa Barbara, Calif.

[22] Filed: May 8, 1975

[21] Appl. No.: 575,830

[52] U.S. Cl. .......................... 178/6.8; 178/DIG. 36; 235/92 MT
[51] Int. Cl.² ......................................... H04N 7/18
[58] Field of Search ...................... 178/6.8, DIG. 36; 235/92 PC, 92 MT

[56] References Cited
UNITED STATES PATENTS

| | | | |
|---|---|---|---|
| 3,180,205 | 4/1965 | Heppe | 178/DIG. 36 |
| 3,321,575 | 5/1967 | Lewczyk | 178/DIG. 36 |
| 3,814,845 | 6/1974 | Hurlbrink | 178/6.8 |

Primary Examiner—Howard W. Britton
Attorney, Agent, or Firm—Daniel J. Meaney, Jr.

[57] ABSTRACT

A television system for dimensional measurement of an object to produce an output analog voltage representative of the dimensional measurement and providing a direct visual readout of the dimensional measurement, which system includes a televising video signal having horizontal synchronizational signals and video information signals in horizontal scan lines which televising means has integral therewith means for generating a horizontal sweep voltage to control a horizontal line scan between successive horizontal synchronized signals, gating means responsive to a predetermined number of gating pulses established by a horizontal and vertical field of view positioning means, an amplifier for amplifying the composite video signal, generating means responsive to the black/white voltage level of the gated video information signal of each of a predetermined number of horizontal line scan increments for generating first and second control signals when the black/white level is at preselected levels, storing means such as a sample and hold circuit which is responsive to the control signals to sample and hold electrical signals representative of the average voltage levels of the horizontal sweep voltage at each horizontal line scan increment when the first and second control signals are generated, a differential amplifier for generating an analog output voltage derived from the difference in stored voltage levels and display means responsive to the analog output voltage for producing a visual read out of the dimensional measurement of the object.

10 Claims, 2 Drawing Figures

TELEVISION MEASURING SYSTEM AND METHOD

BACKGROUND OF THE INVENTION

1. Field of the Invention

This invention relates to monitoring systems and, in particular, to an automatic television measuring system, television apparatus and method for measuring the length of a selected dimension of an object. The present invention is adapted for use with a television microscope system wherein an article having a dimension of relatively small size to be measured, in the order of 0.050 inches or smaller (depending on the resolution of the video camera), is positioned in the viewing station of the television microscope system. The television microscope system televises the article and includes in the video signals generated by the television microscope system information in the form of black/white level contrast which is representative of the dimensional measurement of the article.

The automatic measuring system of the present invention is responsive to the information contained in the video information signals and to the horizontal sweep voltage derived from normal operation of the video camera part of the television microscope system to produce an analog output voltage, direct visual readout or other graphic indicia representing a method for automatically measuring the dimensional measurement of an object is disclosed.

2. Description of the Prior Art

Television microscope measuring systems are known in the art. In one known measuring system, dimensional measurement of a pattern is achieved by televising and displaying the pattern on a television monitor and superimposing thereon a special effect or measuring raster. The superimposed measuring raster overlaps at least one dimension of the pattern to be measured. The known measuring system detects when the video signal of the pattern exceeds a fixed threshold value representative of an abrupt change of black to white level, or vice versa, representative of the end measuring point of the dimensional pattern. In addition, the known measuring system utilizes the special effect or measuring raster, which is responsive to horizontal synchronization signals, to enable a variable frequency pulse generator to generate a number of pulses representative of the elapsed time between discrete changes in black/white levels in the video signal during a horizontal scan line. A digital pulse counter is responsive to the pulse generator to accumulate, count and convert the number of pulses to a visual readout representative of the dimensional measurement of the article. Measurement is, in essence, accomplished by generating a series of pulses representative of a definitive portion of a time interval of a horizontal scan line and converting the so generated pulses into a signal or readout representative of the dimensional pattern so measured.

One disadvantage of the prior art measuring system is that a special effects raster generator having a plurality of variable period one-shot multi-vibrators is required. Further, the basic reference is the scan time between abrupt changes in black/white voltage level of the video signal, which is converted into a series of pulses and counted by a pulse counter.

The synchronization between the special effects raster generator, the one-shot multi-vibrators, the time period of the vibrators, the enabling and disabling of the variable frequency pulse generator, and the pulse counting is necessary to insure accurate measurement. Also, the synchronization of the above must, in turn, be synchronized to the synchronizing signals, blanking signals and other control signals which comprise the composite video signal.

Another known manual measuring system utilizes a television microscope in combination with a manually adjustable measuring point and ending measuring point. The adjustment is made directly in the television scan pattern. The reference or beginning measuring point is manually set by use of a television monitor to coincide with the beginning point of the dimensional measurement of the object to be measured. A second point or end point is manually set to correspond with the end of the dimensional measurement of the object. Dimensional measurement is obtained by measuring the voltage level of a horizontal sweep voltage occurring at each of the beginning and end points in the horizontal scan line. The difference in voltage levels is converted to an analog output voltage, which voltage is then converted to a visual readout representative of the distance between the two manually set reference points.

The manual measuring system has a certain disadvantage in that each measurement requires an operator to manually adjust the beginning point and ending point for each measurement. In certain applications automatic measuring of an object is desired for accuracy, consistency and rapid processing of measured objects.

SUMMARY OF THE INVENTION

The present invention overcomes several disadvantages of the prior art measuring systems. One advantage of the present invention is that the horizontal sweep voltage, which is generated by a video camera, is automatically utilized as a measuring reference. The horizontal sweep voltage is substantially linear during each and every horizontal scan line. Any variations of the horizontal sweep voltage changes each and every horizontal scan line in exactly the same way. Thus, cumulative effects of any changes between voltage references or components are eliminated. Further, the horizontal sweep voltage functions as a reference between generating of the video information and processing of the same for measuring purposes.

Another advantage of the present invention is that high speed and highly efficient sample and hold circuitry can be used to sample the voltage level of the substantially linear horizontal sweep voltage at the precise increments during a predetermined number of horizontal line scans when an abrupt change occurs in each horizontal line scan video information signal black/white level. Electrical signals representative of average voltage levels of the horizontal sweep voltage are stored. By sampling and holding the average voltage level of the horizontal sweep voltage at increments of a predetermined number of horizontal scan lines, the dimensional measurement of an object is precisely represented by the difference in average voltage levels of the horizontal sweep voltage.

By using the horizontal sweep voltage, which is in essence a linear sawtooth voltage waveform, in combination with sample and hold circuitry, the automatic measuring system eliminates the requirement for special effects raster generator, a variable frequency pulse generator and a pulse counter. Synchronization between periods of the one-shot, multi-vibrator of a special effects raster generator and other synchronization signals of the composite signal are avoided. Variations in non-linearity of the horizontal line scan trace are substantially reduced because the dimension measurement and increment of the horizontal scan line are in coincidence. Generation of a predetermined number of pulses to represent time of a horizontal line scan increment may become inaccurate due to such non-linearity.

By use of the automatic measuring system of the present invention, objects can be positioned in the field of view of the television microscope system. By use of selected lens systems, magnification (both optical and electrical) and pre-established boundary determination means, the precise dimensional measurement of the object to be measured is viewed by the video camera and the desired dimensional measurement is automatically and substantially instantaneously converted to an analog output signal, digital signal or a graphic indicia such as a visual display.

Another advantage of the automatic measuring system of the present invention is that the operator can calibrate the system, designate the dimensional measurement where automatic measurement is to take place and program the automatic system to automatically log and measure the dimensional measurement of the preselected part of the object.

Other variations such as the use of solid black lines displayed on a television monitor may be utilized to preselect the dimensional measurement to be measured.

Other applications include the use of circuitry to separately determine if the measured length exceeds, is equal to or less than a standard reference. If desired, the visual readout can read the variation from a standard or programmed dimensional measurement. This has utility and application in inspection and quality control applications. Further, the analog output voltage can be used as an input to a control system to automatically reject objects which exceed or are under a standard or reference as determined by the automatic measuring system.

BRIEF DESCRIPTION OF THE DRAWING

The foregoing and other advantages and features of the invention will be apparent from the following description of the preferred embodiment of the invention when considered with the illustrations in the accompanying drawing which includes the following figures.

DESCRIPTION OF THE PREFERRED EMBODIMENT

Figure 1:
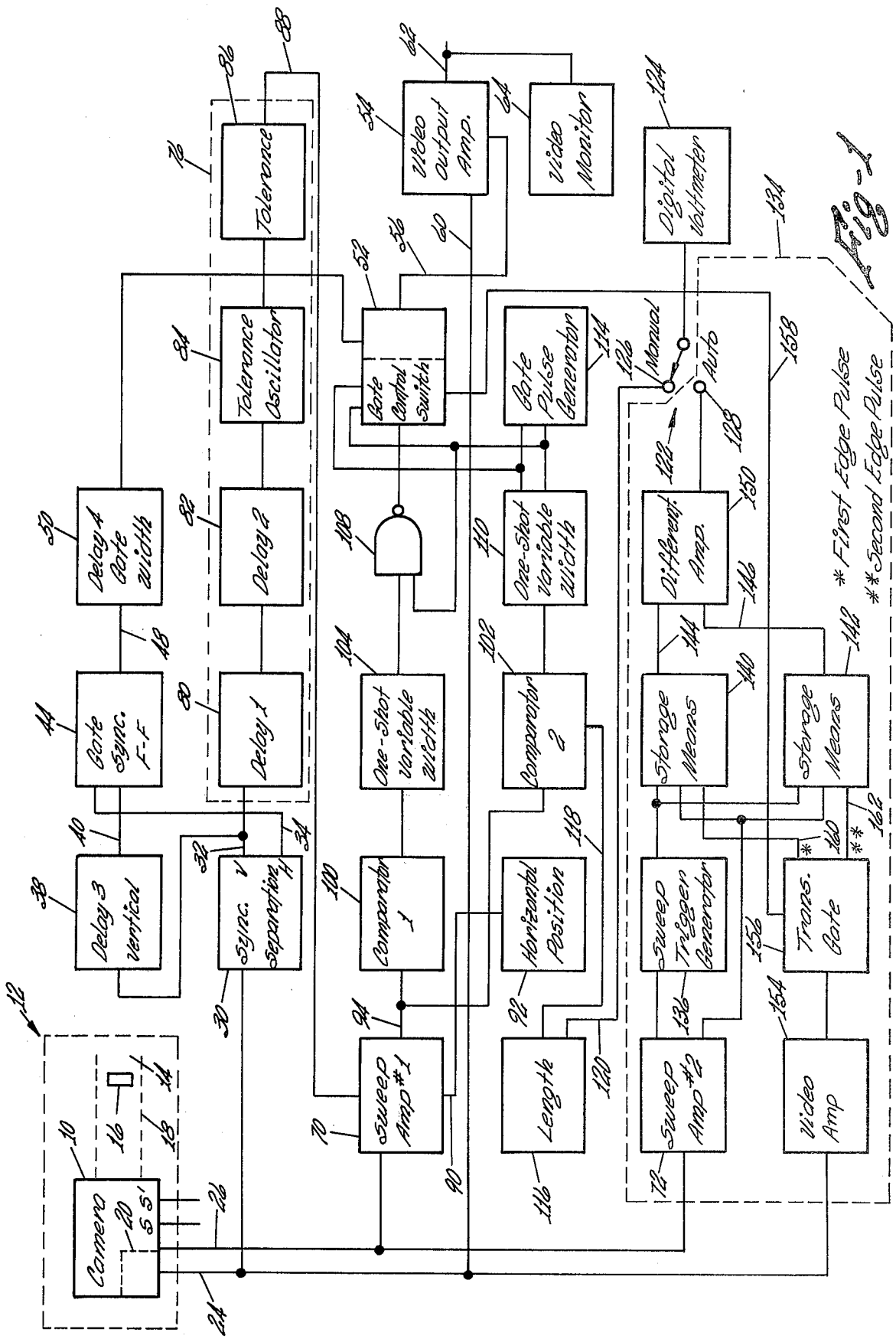
FIG. 1 is a block diagram of a television measuring system having both a manual measuring system and an automatic measuring system.

In FIG. 1 a video camera 10 forms a part of a television microscope system including a viewing station generally designated by dashed rectangle 12. The viewing station 14 of the television microscope system 12 receives an object or article 16 which is to be measured. The object 16 can have its overall dimensional measurements measured or a selected part thereof so measured. By use of optics generally designated by 18 or other electrical means, the desired portion of or all of the object 16 to be measured can be viewed or selected by the television microscope system 12.

The video camera 10 may comprise a conventional televising means which generates a composite video signal from an image. A composite video signal generally includes vertical and horizontal synchronizing signals, blanking signals and video information signals. In commercial television systems, one frame of video information has 1/30 second duration and each video frame comprises 525 horizontal scan lines of information. Generally, the television camera has an odd/even interlace pattern. A horizontal scan line contains video information signals and has a time period of approximately 63.5 micro-seconds. Other video cameras, such as those used in closed television systems having 1000 horizontal line scans per video frame, may be used.

Horizontal synchronized signals and horizontal scan lines are generated by circuitry within the video camera in generating the composite video signals. In connection with each horizontal line scan which occurs between successive horizontal synchronized signals, the video camera generates a horizontal sweep voltage from a horizontal sweep voltage generator 20. The horizontal sweep voltage is in the form of a linear sawtooth voltage waveform which is applied to a deflection yoke which deflects an electronic beam across an optical image to generate the video information signals in horizontal scan lines. The horizontal sweep voltage generator 20 is an integral part of a video camera and a separate voltage generator is not required.

In FIG. 1 the composite video signal developed by video camera 10 is applied to output 24. The horizontal sweep voltage developed by the horizontal sweep voltage generator 20 is applied to output 26.

A synchronizing signal separator 30 is electrically connected to output 24 and functions to separate the vertical synchronizing signals and horizontal synchronizing signals from the composite video signal. The vertical synchronizing signals appear on output 32 and the horizontal synchronizing signals appear on output 34.

The vertical synchronizing signals on output 32 are applied to a vertical synchronizing signal delay 38 having an output 40. The output 40 from the delay 38 is used as an input to a gate synchronizing flip-flop 44. The other input to flip-flop 44 is output 34 from the synchronizing signal separator 30, which output 34 applies horizontal synchronizing signals to the flip-flop 44. In operation, the horizontal synchronizing signals on output 34 function to set the gate synchronizing flip-flop 44. The flip-flop 44 remains set until the delayed vertical synchronizing signals appearing on output 40 from delay 38 are applied to the reset input of flip-flop 44 resetting the same.

An output 48 from flip-flop 44 is applied to a gate 50 which is enabled for a time interval equal to the delay time of delay 38. The output of the gate 50 is an input to a gate control switch 52. Gate control switch 52 is electrically connected to a video output amplifier 54 by a lead 56. Video output amplifier 54 is electrically connected to output 24 by a lead 60. Lead 60 applies the composite video signals to the video output amplifier 54. The output amplifier appears on output terminal 62. Output terminal 62 can be applied to a video monitor 64 or control display devices or the like. Gate control 52, when enabled by control pulses from the manually adjustable portion of the system as described hereinbelow, functions to modulate the composite video signals in the video output amplifier 54, with signals representative of the exact vertical and horizontal components of the dimensional measurement of the object manually measured.

The horizontal sweep voltage appearing on output 26 is applied to a first sweep amplifier 70 and a second sweep amlifier 72. Sweep amplifier 70 functions to apply the horizontal sweep voltage to the manual measuring portion of a television microscope system. Horizontal sweep voltage amplifier 72 functions to apply an amplified horizontal sweep voltage to that portion which functions as the automatic measuring system.

In the manual measuring system, the horizontal sweep voltage amplifier 70 receives an input from and is enabled by a vertical synchronizing signal gating means enclosed by dashed rectangle 76 to establish the depth level of the video frame to be used for measurement. This is referred to as the video line marker mode. The vertical synchronizing signal gating means 76 receives vertical synchronizing signals from output 32 of the synchronizing signal separator 30. The vertical synchronizing signal gating means 76 includes two cascaded delays, 80 and 82, a tolerance oscillator 84 and a tolerance adjusting means 86. Output 88 from the tolerance adjusting means 86 is applied as input to the horizontal sweep voltage amplifier 70. The vertical synchronizing signal gating means 76 functions to permit transmission of amplified horizontal sweep voltages for the horizontal line scan at the selected depth level of the video frame. In addition, the horizontal sweep voltage amplifier 70 is electrically connected by a lead 90 to a horizontal position adjusting means 92 used to set the beginning and end point of the dimensional measurement of the scan. An operator, when measuring with the manual measuring system, utilizes the horizontal position adjusting means 92 to set the exact boundaries for the beginning and end measuring points to be manually measured by the television microscope system. This is accomplished by disabling the horizontal sweep voltage amplifier until a threshold is reached as set by the horizontal position adjusting means 92 corresponding to the beginning measurement point.

When enabled, the amplifier horizontal sweep voltage from the horizontal sweep voltage amplifier 70 appears on output 94. Output 94 supplies the amplified horizontal sweep voltage to comparators 100 and 102. Comparator 100 functions to trigger a one-shot variable width multi-vibrator 104 to condition an AND gate 108 for a duration sufficient to exceed the increment of the horizontal line scan to make the measurement. The output of AND gate 108 enables gate control switch 52.

Comparator 102 is responsive to a length adjusting means 116 which sets the exact length of the object as visually observed by the operator. The length means 116 sets the end measuring point by passing a triggering signal when the threshold level of the comparator is reached as determined by the length adjusting means 116. The triggering signal from comparator 102 triggers a second one-shot variable width multi-vibrator 110. The output of multi-vibrator 110 is applied as an input to the AND gate 108. In addition, the output from the one-shot variable width multi-vibrator 110 is applied to a gate pulse generator 114 and to gate control switch 52. Gate pulse generator 114 is responsive to the multi-vibrator 110 being triggered to generate gating pulses which are applied directly to and enable gate control switch 52 for a predetermined number of horizontal line scans, the exact number being a function of the reset time of variable width multi-vibrator 110.

The length of the dimensional measurement is determined directly from the length adjusting means 116 which is electrically connected to a signal pole double throw switch 122 and contact 126 as an input to a digital volt meter 124. The length adjusting means 116 develops an output voltage equal to the difference between the horizontal sweep voltage at the beginning point and end point of the measurement. The digital volt meter 124 converts the output voltage to a visual readout.

Automatic measuring of the dimensional measurement of the object is obtained by changing the position of the single pole double throw switch 126 to the automatic position 128 from the manual position 126. The automatic measuring portion of a television microscope system is enclosed by dashed rectangle 134. The amplified horizontal sweep voltage from amplifier 72 is applied to a sweep trigger generator 136 and to a first storage means 140 and a second storage means 142. Each of storage means 140 and 142 may be formed of a circuit capable of detecting and storing electrical signals such as known sample and hold circuits. Outputs 144 and 146 from the first storage means 140 and the second storage means 142, respectively, are applied as an input to a differential amplifier 150.

The composite video signal appearing on output 24 is applied as input to a video amplifier 154. The output of the video amplifier 154 is applied to a transfer gating means 156, the other input of which is aplied by a lead 158 from the gate control switch 52.

Gate control switch 52 generates a selected number of gating pulses for enabling transmission of a plurality of increments of horizontal line scan video information. The duration of each gating pulse and the number of gating pulses are determined as follows.

An operator initially establishes boundaries or field of view for the automatic measurement. This is determined by a boundary determination means wherein the horizontal positioning adjusting means 92 is used to establish the beginning point of the horizontal field of view. The beginning point of the measurement is not manually set but horizontal positioning means 92 is set to enable horizontal voltage sweep amplifier 70 to be enabled before the beginning of the object. The length adjustment means 116 is set beyond the end point of the measurement but still triggers comparator 102 at the end of the horizontal field of view. The position means 92 and length means 116 establish the horizontal component of the field of view.

The one-shot variable width multi-vibrator 110 establishes the vertical component field of view. AND gate 108 determines the direction of a gating pulse and so condition gate control switch 52. Gate pulse generator 114 determines the number of horizontal scan lines and so condition gate control switch 52 with a predetermined number of gate pulses.

Gate control switch 52 then enables gating means 156 with a selected number of gating pulses to pass selected increments of video information signals of a predetermined number of horizontal line scans. The leading edge of each gate pulse appears on output 160 and functions as a first control signal. The trailing edge of each gate pulse appears on output 162 and functions as a second control signal.

The first control signal appearing on output 160 is applied to a first storage means 140 and the second control signal appearing on output 162 is applied to a second storage means 146. The first and second storage means 140 and 142 detect and store as a first signal and second signal, respectively, the average voltage level of the horizontal sweep voltage at each increment during the predetermined number of line scans when the first control signals and the second control signals are generated.

An output 144 from storage means 140 applies the first signal to one input of a differential amplifier 150. An output 146 from storage means 142 applies the second signal to differential amplifier 150. The differential amplifier 150 is responsive to the first signal and second signal for generating an analog output voltage derived from the difference between the average voltage levels of the horizontal sweep voltage represented by the stored first and second signal. The output analog voltage, representing the dimensional measurement of the article, is applied via contact 128 of switch 122 to a display means such as a digital volt meter 124.

Figure 2:
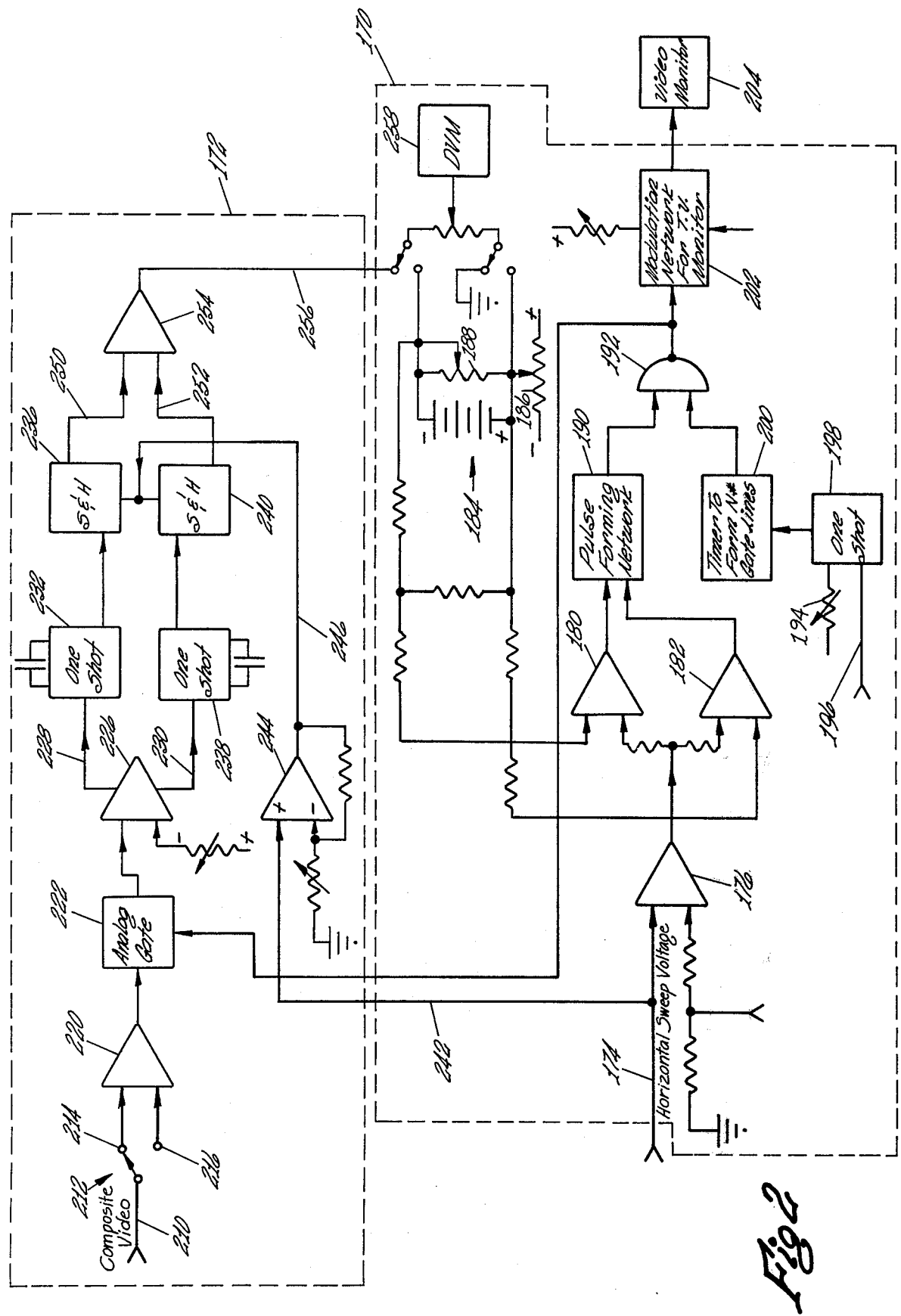
FIG. 2 is a schematic diagram of a circuit adapted for practicing the invention.

Referring now to FIG. 2, the manual measuring system is enclosed by dashed box 170 and the portion forming the automatic measuring system is enclosed by dashed box 172. The block diagram and components in the manual measuring system 170 provide substantially the same function as described in FIG. 1. The horizontal sweep voltage from the video camera is applied to lead 174. Lead 174 applies the horizontal sweep voltage to a horizontal sweep voltage amplifier 176. The output of amplifier 176 is applied to one input of each comparator 180 and 182. A reference voltage source generally designated as 184 generates a reference voltage. Variable resistor 186 functions as the horizontal positioning means and variable resistor 188 functions as the length adjusting means. The reference voltage determined by the setting of resistors 186 and 188 are applied to the other inputs of comparators 180 and 182. The outputs from the comparators 180 and 182, when the horizontal sweep voltages exceed the threshold levels, are applied to the gating pulse forming network generally designated as 190. The output from the pulse forming network 190 is applied as one of two inputs to a AND gate 192 which functions as gate control switch 52 of FIG. 1.

A vertical position signal is set by variable resistor 194. Vertical synchronizing signals are applied on input 196 to trigger a one-shot mulit-vibrator 198. The output of the one-shot mulit-vibrator is used to gate a timer 200 which determines the "$n$" number of horizontal line scans to be used. The output of timer 200 is applied as the other input to the AND gate 192. The output of the AND gate 192 is a selected number of gating pulses which are applied to a modulation network 202, which modulation network generates modulation signals to modulate the composite video signals applied to a video modulator 204, and to the automatic portion of the automatic measuring system 172.

The automatic measuring portion of the system 172 receives the composite video signals, which contain black/white level information signals on lead 210. Lead 210 is electrically connected to a single pole, double throw switch 212 having a first contact 214 and a second contact 216. In this embodiment, first contact 214 is designated as the means for programming that a change of white level to black level represents the beginning measuring point and vice versa for the other point. Second contact 216 is designated as the means for programming that a change of black level to white level represents the beginning measuring point or boundary for the dimensional measurement of the object and vice versa for the other point. First contact 214 and second contact 216 are electrically connected to amplifier 220. The output of the amplifier is the amplified video signal which is applied as one input to analog gate 222. The other input to analog gate 222 is the input from AND gate 192 in the form of a selected number of gating pulses. The gating pulse enables the analog gate 222 during each horizontal scan line and the number of "$n$" horizontal scan lines is determined by the number of gating pulses. Thus, analog gate 222 is disabled at all times except for passing selected increments of video information signal of each horizontal scan line known to contain pertinent measuring data.

The output from analog gate 222 is applied to a comparator 226 which established a threshold level which must be reached or dropped below by the video information signal changing white/black level to represent the beginning and vice versa to represent the beginning and end of the measuring points of the object. when the video information signal of a horizontal scan line exceeds a first preselected level representative of one boundary of the dimensional measurement, a first control signal is generated on output 228 of comparator 226. When the video information signal is at a second preselected level, representative of the other boundary of the dimensional measurement, a second control signal is generated on output 230 of comparator 226. This occurs for each gated increment of horizontal line scan.

Output 228 from comparator 226 is applied to a one-shot multi-vibrator 232. One-shot multi-vibrator 232 is responsive to the first control signal to trigger a sample and hold circuit 234 to detect the level of the horizontal sweep voltage at the increment of the horizontal scan line when the one-shot multi-vibrator 232 is triggered.

Output 230 from comparator 226 applies the second control signal to a second one-shot multi-vibrator 238. One-shot multi-vibrator 238 is responsive to the second control signal to trigger a second sample and hold circuit 240. Sampled and hold circuit 240 samples the average voltage levels of the horizontal sweep voltage at the increment of the horizontal scan line when the one-shot multi-vibrator 238 is triggered by the second control signal during successive horizontal line scans of a predetermined number.

The horizontal sweep voltage appearing on lead 174 is applied by a second lead 242 to a separate horizontal sweep voltage amplifier 244. Amplifier 244 has an output 246 which applies the amplifier horizontal sweep voltage to both sample and hold circuits 236 and 240. In operation, the horizontal sweep voltage is a substantially linear saw tooth waveform. The amplifier 244 amplifies the saw tooth waveform and applies the same to sample and hold circuit 236 and 240. The first control signal triggers the one-shot multi-vibrator 232 causing sample and hold circuit 236 to sample the saw tooth waveform and store an electrical signal representative of the voltage level of the horizontal sweep voltage at that increment of the horizontal scan line. Similarly, the second one-shot multi-vibrator 238 is responsive to the second control signal to detect and store as a second signal the voltage level of the horizontal sweep voltage at that interval during the horizontal line scan when a second discrete change is measured in the black/white level of the video information signal. For each increment of the predetermined number of horizontal scan lines, the voltage is sampled each time a first and second control signal is generated. Thus the samples in held first and second signals represent the average voltage level of horizontal sweep voltage for a predetermined number of horizontal line scans.

Sample and hold circuit 236 and 240 apply the electrical signals representative of the average horizontal sweep voltage via leads 250 and 252 to a differential amplifier 254. Differential amplifier 254 is responsive to the first signal and second signal stored in the sample and hold circuits 236 and 240 for generating an analog output voltage derived from the difference between the average voltage levels of the horizontal sweep voltage represented by the stored first signal and second signal. The differential amplifier 254 generates the analog output voltage and supplies the same via output 256 and through an input network to a digital volt meter 258. The analog output voltage developed by differential amplifier 254 represents the dimensional measurement of an article.

Of importance is that a video monitor is not necessary in connection with the automatic measurement and display of the dimensional measurement of the object.

If desired, other peripheral equipment may be electrically connected to the output of the differential amplifier 254 to receive and convert the analog output voltage to a different electrical signal or display. For example, the analog output voltage can be converted to a digital signal as is done internally in the digital volt meter 258. Also, such a digital signal can be applied as an input to a digital control system. Alternatively, the analog signal can be applied to a hard copy printer which is responsive to the analog output voltage to produce a printed copy of the measurement in any desired format.

The method for measuring the dimensions of an object as illustrated by FIG. 2 includes the following steps: imaging the object with a video camera having means for generating a horizontal sweep voltage to produce a composite video signal having horizontal sychronizing signals and video information signals; amplifying the composite video signal; gating the amplifier composite video signals with a selected number of gating pulse for enabling transmission of a predetermined number of increments of a horizontal line scan video information signals; establishing the horizontal and vertical components of the field of view wherein the duration of gating pulses as determined by the horizontal field of view component and the number of pulses is determined by the vertical field component; generating a first control signal when the gated video information signal of a horizontal line scan is at a first preselected level and a second control signal when the gated video information signal is at a second preselected level; detecting and storing as a first signal and a second signal the average voltage levels of the horizontal sweep voltage at increments during each horizontal line scan for the predetermined number of horizontal scan lines occurring between successive horizontal synchronizing signals when the first control signal and the second control signal are generated; generating from the detecting and storing means an output analog voltage derived from the difference between the average voltage levels of the horizontal sweep voltage represented by the stored first signal and second signal, which analog output voltage represents the dimensional measurement of an object; and displaying as a graphic indicia, for example, with a digital volt meter the dimensional measurement of the object represented by the output analog voltage.

It is envisioned that other electrical components could be used in lieu of the one-shot multi-vibrator 232 and 238 and the sample and hold circuits 236 and 240. If an extremely high speed sample and hold circuit were used, measurement of an object would be accomplished in a single horizontal line scan.

In the embodiment described herein, reference has been made to a video camera capable of generating composite video signal for black and white level signals. However, it is anticipated that a color video camera could likewise be used for this application. For example, one or more video information signals representing variations in color intensity of the primary red, blue and magenta colors could be monitored and the signal level thereof detected in substantially the same way as the black/white intensity or contrast levels are monitored to represent boundaries of an object. Thus, an automatic measuring system, apparatus and method could use a standard color video camera in lieu of a black/white camera in practicing this invention.

What is claimed is:

1. A system for generating an analog output voltage representative of the dimensional measurement of an article comprising means for televising said object to produce a composite video signal thereof having horizontal synchronizing signals and video information signal, said televising means including means for generating a horizontal sweep voltage which controls the video signal during each horizontal line scan occurring between successive horizontal synchronizing signals;

amplifying means electrically connected to the televising means and responsive to said composite video signal for producing an amplified composite video signal;

gating means responsive to said amplified composite video signal and to a selected number of gating pulses for enabling transmission of a plurality of increments of horizontal line scan video information signals;

boundary determination means responsive to the horizontal sweep voltage and having a horizontal position set means for establishing the horizontal component of the field of view of an object to be measured and a vertical position set means for establishing the vertical component field of view of the object to be measured, said horizontal and vertical components of fields of view being slightly larger than the horizontal and vertical components of the dimensional measurement of the object to be measured;

horizontal line scan gating means responsive to said horizontal sweep voltage, said horizontal position set means and said vertical position set means for generating said selected number of gating pulses each having a duration equal to that increment of a horizontal line scan defined by the horizontal component of the field of view and the selected number of gating pulses being determined by vertical component of the field of view;

means responsive to said predetermined number of gated horizontal line scan video information signals for generating during each horizontal line scan a first control signal when the video information signal is at a first preselected level representative of one boundary of the dimensional measurement and a second control signal when the video information signal is at a second preselected level representative of the other boundary of the dimensional measurement;

means electrically connected to said control signal means and responsive to the horizontal sweep voltage for detecting and storing as a first signal and a second signal the average voltage level of said horizontal sweep voltages at each increment during the predetermined number of line scans when said first control signals and said second control signals are generated; and output generating means electrically connected to said storing means and responsive to the first signal and second signal stored therein for generating an analog output voltage derived from the difference between the voltage levels of said horizontal sweep voltage represented by said stored first signal and second signal, which analog output voltage represents the dimensional measurement of an article.

2. The system of claim 1 further comprising display means electrically connected to the output generating means and responsive to the analog output voltage to produce a visual readout representing the dimensional measurement of an article.

3. The system of claim 1 further comprising amplifying means electrically connected to said televising means for receiving the horizontal sweep voltage from a horizontal sweep voltage generator within said televising means and for supplying said amplifier horizontal sweep voltage to said detecting and storing means.

4. The system of claim 3 wherein the detecting and storing means comprises a first and second one-shot multi-vibrator which are responsive to each first control signal and each second control signal during each horizontal line scan; and a first and second sample and hold circuit electrically connected to said first and second one-shot multi-vibrator for storing as said first signal and as said second signal the average voltage level of the horizontal sweep voltage at each increment of the predetermined number horizontal line scans in response to said first control signals and said second control signals.

5. Apparatus for dimensional measurement of the length of an object comprising means for televising said object to produce a composite video signal thereof having horizontal synchronizing signals and video information signals, said televising means including means for generating a horizontal sweep voltage during each horizontal line scan between successive horizontal synchronizing signals;

amplifying means responsive to the horizontal sweep voltage generating means for generating a linear saw tooth reference voltage therefrom;

amplifying means electrically connected to the televising means and responsive to said composite video signal for producing an amplified composite video signal;

gating means responsive to said amplified composite video signal and to a selected number of gating pulses for enabling transmission of a plurality of increments of horizontal line scan video information signals;

boundary determination means responsive to the horizontal sweep voltage and having a horizontal position set means for establishing the horizontal component of the field of view of an object to be measured and a vertical position set means for establishing the vertical component field of view of the object to be measured, said horizontal and vertical components of fields of view being slightly larger than the horizontal and vertical components of the dimensional measurement of the object to be measured;

horizontal line scan gating means responsive to said horizontal sweep voltage, said horizontal position set means and said vertical position set means for generating said selected number of gating pulses each having a duration equal to that increment of a horizontal line scan defined by the horizontal component of the field of view and the selected number of gating pulses being determined by vertical component of the vield of view;

means responsive to the video information signals generated during a horizontal line scan for generating a first control signal when the video information signal is at a first preselected level and a second control signal when the video information signal is at a second preselected level;

means electrically connected to said generating means and said amplifying means for sampling and holding the voltage level of said saw tooth reference voltage at each increment during the horizontal line scan when each of said first control signal and said second control signal is generated;

means electrically connected to said sample and holding means and responsive as the voltage levels stored therein for generating an output voltage derived from the difference between the stored voltage levels of said saw tooth reference voltage; and display means electrically connected to said output voltage generating means for producing a graphic indicia representative of the length of the dimensional measurement of the object.

6. The apparatus of claim 5 wherein said display means comprises a digital volt meter.

7. Apparatus for automatically measuring the length of an object and displaying the length measurement as a visual readout comprising a video camera positioned to have an object to be measured in the field of view of the video camera, said video camera generating composite video signals including horizontal synchronizing signals and video information signals and having means in generating a horizontal sweep voltage integral with generation of the composite video signal;

an amplifier electrically connected to the video camera for receiving said composite video signals and producing in response thereto amplified composite video signals;

amplifying means electrically connected to the televising means and responsive to said composite video signal for producing an amplified composite video signal;

gating means responsive to said amplified composite video signal and to a selected number of gating pulses for enabling transmission of a plurality of increments of horizontal line scan video information signals;

boundary determination means responsive to the horizontal sweep voltage and having a horizontal position set means for establishing the horizontal component of the field of view of an object to be measured and a vertical position set means for establishing the vertical component field of view of the object to be measured, said horizontal and vertical components of fields of view being slightly larger than the horizontal and vertical components of the dimensional measurement of the object to be measured;

horizontal line scan gating means responsive to said horizontal sweep voltage, said horizontal position set means and said vertical position set means for generating said selected number of gating pulses each having a duration equal to that increment of a horizontal line scan defined by the horizontal component of the field of view and the selected number of gating pulses being determined by vertical component of the field of view;

a comparator having a first input, a second input and a first output and a second output, said comparator having one of said first and second inputs electrically connected to a reference voltage and the other of said first and second inputs electrically connected to said gating means to receive said gated increments of each horizontal line scan video information signal, said comparator generating a first control signal on said first output in response to the gated video information signal of each horizontal line scan increment being at said first voltage level and a second control signal on said second output in response to the video information signal of each horizontal line scan increment being at said second voltage level;

a first storage means electrically connected to said amplifying means and to said first output of said comparator and being responsive to a first control signal from said comparator to store as a first reference signal the average voltage level of the amplified horizontal sweep voltage when said gated video information signal of each increment of the horizontal line scan is at said second voltage level;

differential amplifying means having a first and second input and a first and second output, said first and second input being electrically connected to said first and second storage means and responsive to the differential between the first and second reference signals stored therein to produce an analog output voltage derived from the difference between the voltage levels of said amplified horizontal sweep voltage represented by said stored first signal and second signal, which analog output voltage represents the dimensional measurement of an object; and display means electrically connected to said differential amplifying means for displaying as a visual readout the dimensional measurement of the object represented by said analog output voltage.

8. An automatic measuring system adapted for use with a television microscope system having a video camera which includes means for generating a horizontal sweep voltage and a composite video signal, having horizontal synchronizing signals and video information signals in horizontal line scans, for generating an analog output voltage representative of the dimensional measurement of an article, the improvement comprising pulsed gating means responsive to means for selecting the horizontal and vertical components of field of view to pass video information signals of a selected number of increments of horizontal line scans;

means responsive to each gated video information signal of each horizontal line scan for generating a first control signal when the video information signal is at a first level representative of one boundary of the dimensional measurement and a second control signal when the video information signal is at a second level representative of the other boundary of the dimensional measurement;

storage means electrically connected to said generating means and responsive to each of said first and second control signals of each increment of horizontal line scan for detecting and storing first and second electrical signals representative of the average voltage levels of said horizontal sweep voltage at each horizontal line scan increments said first and second control signals are generated by said generating means; and differential amplifying means electrically connected to said storage means and responsive to the difference between said first signal and said second signal for deriving therefrom an analog output voltage representative of the dimensional measurement of an article.

9. A method for measuring a dimension of an object comprising imaging said object with a video camera having means for generating a horizontal sweep voltage to produce a composite video signal having horizontal synchronizing signals and video information signals;

amplifying said composite video signal for producing an amplified composite video signal;

gating said amplified composite video signal with a selected number of gating pulses for enabling transmission of a predetermined number of increments of horizontal line scan video information signals;

establishing the horizontal component of the field of view of an object to be measured with a horizontal position set means and the vertical component field of view of the object to be measured with a vertical position set means, said horizontal and vertical components of fields of view being slightly larger than the horizontal and vertical components of the dimensional measurement of the object to be measured;

gating said horizontal sweep voltage, said horizontal position set means and said vertical position set means for generating said selected number of gating pulses each having a duration equal to that increment of a horizontal line scan defined by the horizontal component of the field of view and the selected number of gating pulses being determined by vertical component of the field of view;

generating a first control signal when the gated video information signal of each horizontal line scan is at a first preselected level and a second control signal when the gated video information signal of each horizontal line scan is at a second preselected level;

detecting and storing as a first signal and a second signal the average voltage level of the horizontal sweep voltage at increments during each horizontal line scan occurring between successive horizontal synchronizing signals when said first control signals and said second control signals are generated;

generating from said detecting and storing means an output analog voltage derived from the difference between the average voltage levels of said horizontal sweep voltage represented by said stored first signal and second signal, which analog output voltage represents the dimensional measurement of an object; and displaying as graphic indicia the dimensional measurement of the object represented by said output analog voltage.

10. The method of claim 9 further comprises the step of amplifying the horizontal sweep voltage generated by the television camera and applying an amplified horizontal sweep voltage to said detecting and storing means.

* * * * *